United States Patent
Kropaczek et al.

(10) Patent No.: US 7,636,652 B2
(45) Date of Patent: Dec. 22, 2009

(54) METHOD AND APPARATUS FOR FACILITATING RECOVERY OF NUCLEAR FUEL FROM A FUEL POOL

(75) Inventors: David Joseph Kropaczek, Wilmington, NC (US); Steven Barry Sutton, Wilmington, NC (US); Christian Carlos Oyarzun, Wilmington, NC (US); Carey Reid Merritt, Wilmington, NC (US); John Dean Fuller, Wilmington, NC (US); William Earl Russell, II, Wilmington, NC (US); Margaret Estelle Harding, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 0 days.

(21) Appl. No.: 10/678,170

(22) Filed: Oct. 6, 2003

(65) Prior Publication Data

US 2005/0086036 A1 Apr. 21, 2005

(51) Int. Cl.
G06G 7/48 (2006.01)
G21C 19/00 (2006.01)

(52) U.S. Cl. .......................... 703/6; 376/267

(58) Field of Classification Search .............. 703/6; 345/473; 715/769, 771; 376/267
See application file for complete search history.

(56) References Cited

U.S. PATENT DOCUMENTS

| | | | | |
|---|---|---|---|---|
| 4,988,476 A | * | 1/1991 | Sadaoka et al. | 376/245 |
| 5,414,809 A | * | 5/1995 | Hogan et al. | 715/765 |
| 5,793,636 A | * | 8/1998 | Cooney et al. | 700/213 |
| 5,923,717 A | * | 7/1999 | Fawks, Jr. | 376/245 |
| 5,949,837 A | * | 9/1999 | Radkowsky | 376/173 |
| 6,404,437 B1 | * | 6/2002 | Russell et al. | 345/473 |
| 6,748,348 B1 | * | 6/2004 | Russell, II | 703/6 |
| 6,931,090 B2 | * | 8/2005 | Chao et al. | 376/267 |

OTHER PUBLICATIONS

Nuclear Reactor Engineering, Third Edition, by Samuel Glasstone and Alexander Sesonske, Van Nostrand Reinhold, 1981, Nuclear Fuel Management at pp. 528-534.*

Kevin O'Sullivan, Donald Hines, Rod Grow, "Update . . . " vol. 17, Issue 1, Summer 2002, Utility Resource Associates Corporation, Rockville Md. pp. 1-4.*

* cited by examiner

Primary Examiner—Paul L Rodriguez
Assistant Examiner—Dwin M Craig
(74) Attorney, Agent, or Firm—Harness, Dickey & Pierce, PLC

(57) ABSTRACT

The apparatus for creating and editing a nuclear reactor core template includes a graphical user interface and a processor controlling the graphical user interface to allow a user to selectively populate a loading map with fuel bundles residing in at least one fuel pool.

14 Claims, 5 Drawing Sheets

FIG. 4

Filter Burnt Fuel

- ☑ K∞     >   1.2
- ☑ Exposure    <   2000
- ☑ Cycle

| | Cycle |
|---|---|
| ☑ | 2 |
| ☐ | 3 |
| ☑ | 4 |
| ☐ | |
| ☐ | |

- ☑ Pedigree

| | Status |
|---|---|
| ☑ | RU |
| ☑ | RP |
| ☐ | DC |
| ☐ | DD |

- ☑ Product Line

| | Product |
|---|---|
| ☑ | GE 11 |
| ☑ | GE 12 |
| ☐ | GE 6 |
| ☐ | GE 8 |

[OK] [CANCEL]

METHOD AND APPARATUS FOR FACILITATING RECOVERY OF NUCLEAR FUEL FROM A FUEL POOL

BACKGROUND

The information setting forth the placement of fuel bundles, each of which has various attributes, in a nuclear reactor core is referred to as the loading map. In conventional core design, creating the loading map is an experienced based, trial and error, iterative process.

The core designer generally receives plant specific critical to quality factors such as plant cycle energy requirements, thermal and operational limits, shut down margins, etc. The core designer will also have information on the layout of the reactor core; namely, an indication of the how the nuclear fuel bundles are positioned within the core. Some of the critical to quality factors may even concern the layout. For example, the core designer may receive input requiring the positioning of certain fuel bundles within the layout.

Given this information, the core designer then makes a guess, based on experience and various rules of thumb he may have developed over time, on the initial positioning of fuel bundles in the reactor core. Specifically, the core designer guesses how many fresh fuel bundles to place in the core, and what types of fresh fuel bundles to use. A fresh fuel bundle is a fuel bundle that has not been exposed. Fuel bundles of the same type have substantially the same attributes. The attributes include but are not limited to: uranium loading, average enrichment, gadolinia loading, number of axial zones, product line, and thermal-mechanical characteristics of the fuel bundles. Different types of fresh fuel bundles have one or more different attributes. In deciding how many fresh fuel bundles to use, the core designer is also deciding how many of the fuel bundles currently in the core to reuse. Reusing the fuel bundles currently present in the core can mean leaving a fuel bundle in its existing location, or moving the fuel bundle to a different location in the core.

As part of the core design, the core designer also determines other operational parameters of the reactor core such as control blade positions, core flow, etc. Having specified these operational control parameters, a Nuclear Regulatory Commission (NRC) licensed simulation program is then run on the initial core design. Based on the results of the simulation, the core designer utilizes experience and rules of thumb to fix perceived problems in the design and, in general, improve the design; particularly with respect to the critical to quality factors. These changes may include changing the loading map. The process repeats until the core designer is satisfied with the design.

SUMMARY OF THE INVENTION

The present invention provides a method and apparatus for using nuclear fuel discarded to one or more fuel pools in a loading map for a new cycle of a nuclear reactor.

In one exemplary embodiment, a graphical user interface under the control of a computer processor provides a user with the capability to selectively populate a loading map with fuel bundles residing in at least one fuel pool. For example, the computer processor may include a memory storing at least one fuel pool database. The fuel pool database includes a list of at least a portion of the fuel bundles residing in the fuel pool, and the user may select which of these fuel bundles to use in creating the loading map.

In an exemplary embodiment, the fuel pool database indicates one or more attributes for the listed fuel bundles, and the graphical user interface that includes one or more fuel pool database management tools for aiding in the selection process. For example the tools may provide for filtering and/or sorting the fuel pool database.

In a further exemplary embodiment, the a graphical user interface is controlled to further allow the user to selectively populate the loading map with different types of fresh fuel bundles. For example, the computer processor may include a memory storing at least one fresh bundle type database. The fresh bundle type database includes a list of fresh bundle types, and the user may select which of these fuel bundles to use in creating the loading map.

In an exemplary embodiment, the fresh bundle type database indicates one or more attributes for the listed fuel bundles types, and the graphical user interface that includes one or more fresh bundle type database management tools for aiding in the selection process. For example the tools may provide for filtering and/or sorting the fresh bundle type database.

A reactor may then be operated using a loading map that contains fuel bundles recovered from one or more fuel pools.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting on the present invention and wherein:

FIG. 4 illustrates a filter window displayed by a loading map editor of the present invention.

DETAILED DESCRIPTION OF THE EXEMPLARY EMBODIMENTS

A Generic Architecture

Figure 1:
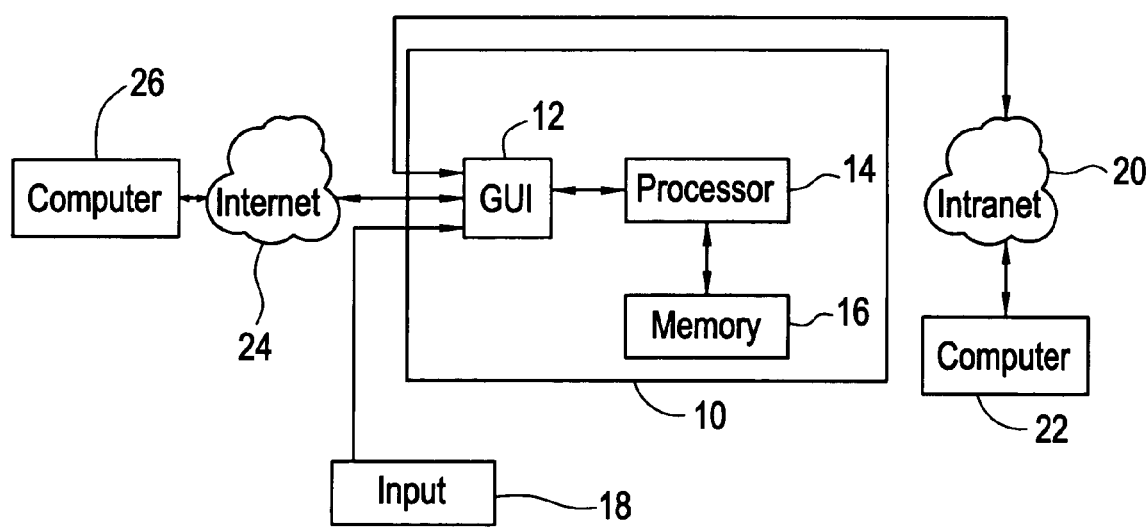
FIG. 1 illustrates an embodiment of an architecture according to the present invention.

FIG. 1 illustrates an embodiment of an architecture according to the present invention. As shown, a server 10 includes a graphical user interface 12 connected to a processor 14. The processor 14 is connected to a memory 16. The server 10 is directly accessible by a user input device 18 (e.g., a display, keyboard and mouse). The server 10 is also accessible by computers 22 and 26 over an intranet 20 and the Internet 24, respectively. The operation of the architecture shown in FIG. 1 will be discussed in detail below.

Creating a Template

Figure 2:
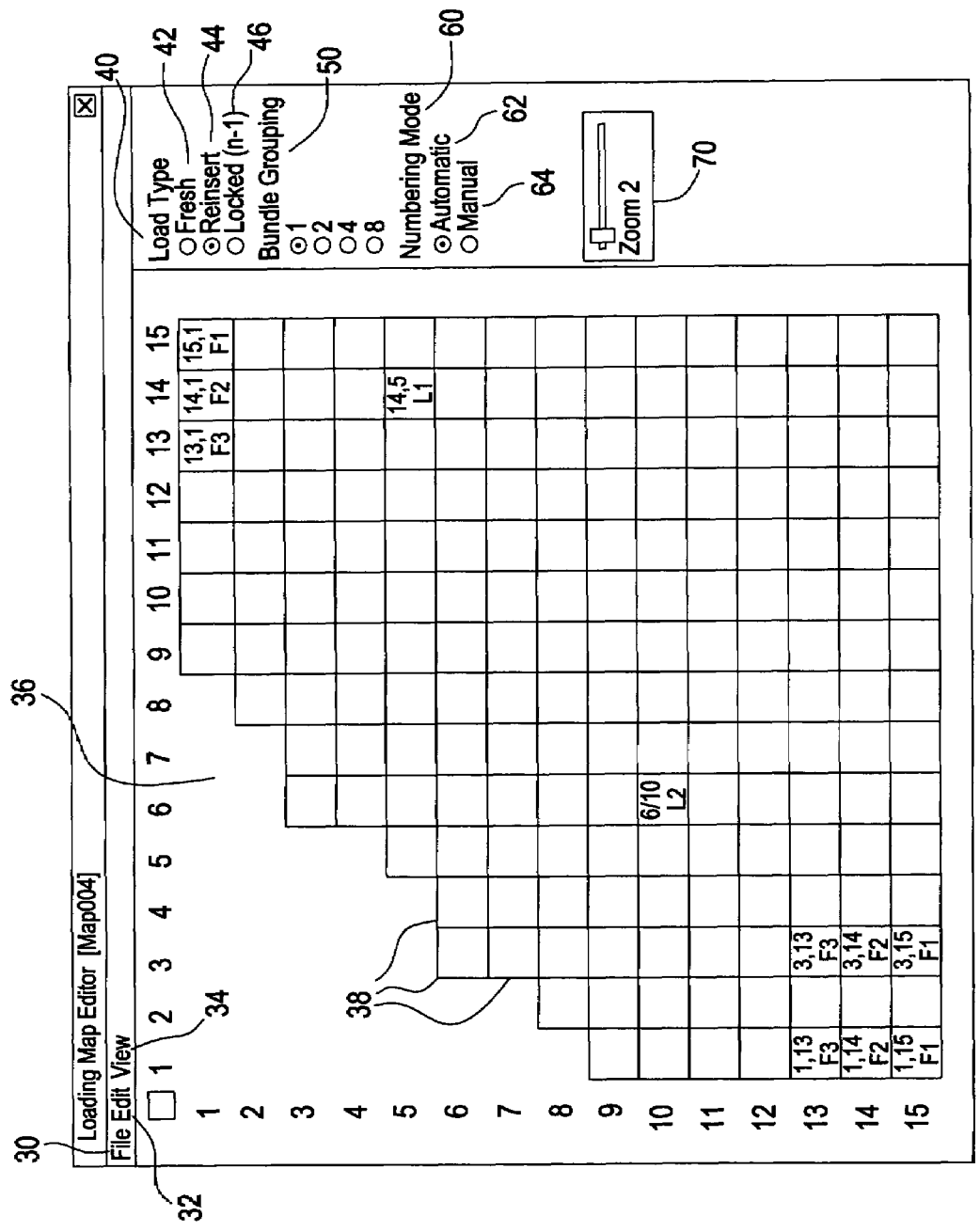
FIG. 2 illustrates a screen shot of a partially completed template designed according to the methodologies of the present invention using the loading map editor of the present invention.

A user via input 18, computer 26 or computer 22 accesses the server 10 over the graphical user interface 12, and runs a loading map editor program stored in memory 16 according to an exemplary embodiment of the present invention. The loading map editor provides for creating and editing a graphical representation of a nuclear reactor core referred to as a template. However, another form of conveying this information, such as a text file, may also be thought of as the template. FIG. 2 illustrates a quarter-core screen shot of a partially completed template designed according to the methodologies of the present invention using the loading map editor of the present invention.

When the loading map editor is initially run, the user has the option via a file menu 30 to access a previously created template or to begin a new template. Assuming the user begins a new template, the loading map editor request the user to identify the nuclear reactor for which the template is being created. The loading map editor then retrieves the geometry of the identified nuclear reactor from a relational database containing nuclear reactor plant characteristics stored in the memory 18. The loading map editor then displays a blank colorless fuel bundle field 36 of the appropriate size based on the retrieved plant characteristics with the rows and columns numbered (such as with the fuel bundle position Row 6, Column 3 in FIG. 2).

Within the fuel bundle field 36, the user may then, for example, using a mouse associated with the input 18, computer 26 and computer 22 click on the fuel bundle positions 38 in the array of possible fuel bundle positions to identify the type (fresh, reinsert, or locked) and grouping of the actual fuel bundle in that position. In the context of a template, a bundle group consists of 1, 2, 4, or 8 bundles and an associated symmetry pairing of bundles within the group which may be performed either mirror or rotationally symmetric. As shown on the right side of FIG. 2, the loading map editor provides several tools for performing this assignment task. Specifically, the tools include the headings Load Type 40, Bundle Grouping 50 and Numbering Mode 60.

Under the Load Type 40 tool heading, the loading map editor includes a Fresh radio button 42, a Reinsert radio button 44 and a Locked radio button 46. The Fresh, Reinsert and Locked radio buttons 42, 44 and 46 correspond to fresh, reinsert and locked fuel bundle categories. The user, for example, clicks on the desired radio button to choose the desired category and then clicks on the fuel bundle position 38 in the fuel bundle field 36 to assign that category to the fuel bundle position 38. The fresh fuel bundle category indicates to insert fuel bundles that have not been exposed. The loading map editor then displays "F" and a number "N" at the bottom of the fuel bundle position 38. The "F" indicates the fresh fuel bundle category, and the number "N" indicates the Nth fresh bundle type 38. As will be appreciated, the loading map editor maintains a count of the number of fuel bundle types assigned to the core. Multiple bundle positions can be assigned the same bundle type by specifying the same "F" and "N" value for each position.

The locked fuel bundle category indicates that a fuel bundle currently occupying an associated fuel bundle position in an actual nuclear reactor core is to remain in that position in creating a new nuclear reactor core loading map. The loading map editor displays "L" and a number "N" in the fuel bundle position 38 when the locked fuel bundle category is assigned. The "L" indicates the locked fuel bundle category, and the number "N" indicates the Nth locked bundle group.

The reinsert fuel bundle category indicates to insert a fuel bundle that has been exposed. The loading map editor displays only a number "N" in the fuel bundle position 38 when the reinsert fuel bundle category is assigned. The number indicates a priority of the fuel bundle position 38. The number and the priority indicated by the number will be described in detail below with respect to the Numbering Mode 60 heading.

In an exemplary embodiment, the loading map editor displays the fuel bundle positions 38 in a color associated with the assigned category. For example, fresh are displayed in blue, locked are displayed in yellow, and reinserted are displayed in violet.

Under the Bundle Grouping 50 heading, the loading map editor includes a "1" radio button, a "2" radio button, a "4" radio button, and an "8" radio button. When the "1" radio button is selected by the user, for example, by clicking on the "1" radio button, the category assigned by the user to a fuel bundle position 38 is associated only with the fuel bundle position 38 chosen. Selecting the "2" radio button and assigning a category to a fuel bundle position 38 causes the category to be assigned to the selected fuel bundle position as well as the fuel bundle position 180 degrees symmetric to the selected fuel bundle position. Selecting the "4" radio button causes the loading map editor to request the user to chose between rotational and mirror symmetry. Rotational symmetry is an image property indicating there is a center point around which the object is turned a certain number of degrees and the object still looks the same (i.e., it matches itself a number of times while it is being rotated,). Mirror symmetry (or line symmetry) indicates a correspondence in size, shape, and relative position of parts on opposite sides of a dividing line. If the user assigns a category to a fuel bundle position when rotational symmetry is chosen, this causes the category to be assigned to the selected fuel bundle position as well as the fuel bundle position 38 in each of the other quadrants rotationally symmetric to the selected fuel bundle position. If the user assigns a category to a fuel bundle position when mirror symmetry is chosen, this causes the category to be assigned to the selected fuel bundle position as well as the fuel bundle position in each of the other quadrants symmetric to the selected fuel bundle position.

Selecting the "8" radio button causes the loading map editor to consider the total fuel bundle field 36 as octant symmetric—eight symmetric pie pieces. Assigning a category to a fuel bundle position when the "8" radio button is selected causes the category to be assigned to the selected fuel bundle position 38 as well as the fuel bundle positions 38 in each of the other eight pie pieces symmetric to the selected fuel bundle position 38.

Under the Numbering Mode 60 heading, the loading map editor includes an Automatic radio button 62 and a Manual radio button 64. Choosing between an automatic numbering mode by selecting the Automatic radio button 62 and a manual numbering mode by selecting the Manual radio button 64 is only permitted when the Reinsert radio button 44 or Fresh radio button 42 has been selected. The numbering mode in general is inapplicable when the Locked radio button 46 is selected.

When the Automatic radio button 62 is selected, the loading map editor, which maintains a count of the number of fuel bundle positions 38 assigned the reinsert fuel bundle category, assigns the count plus one to the next fuel bundle position 38 assigned the reinsert fuel bundle category. The assigned number is displayed at the bottom of the fuel bundle position 38. Likewise, the loading map editor maintains a count of the fresh bundle types. When a fuel bundle position 38 is assigned the fresh bundle category the count plus one, referred to above as N, is assigned to that position. "F" and the value of N are displayed at the bottom of the fresh fuel bundle position.

When the Manual radio button 64 is selected, the loading map editor maintains the count of the number of fuel bundle positions 38 assigned the reinsert fuel bundle category, but does not assign numbers to the fuel bundle positions 38. Instead, the user may position a cursor in the fuel bundle position 38 and enter the number manually. As alluded to above, the assigned numbers represent assigned priorities. The priorities indicate an order for loading exposed fuel bundles based on an attribute of the exposed fuel bundles. The attributes include, but are not limited to, K infinity (which is a well-known measure of the energy content of the fuel bundle, exposure of the bundle (which is accumulated megawatt days per metric ton of uranium in the bundle), residence time of the bundle (which is how long the bundle has been resident in the nuclear reactor core), etc. In one exemplary embodiment, the shade of the color associated with the reinserted fuel bundle positions varies (lighter or darker) in association with the assigned priority.

The loading map editor according to the present invention also provides several viewing options via a view menu 34 and a zoom slide button 70. Adjusting the zoom slide button 70 by clicking and dragging the zoom slide button 70 to the left and the right decreases and increases the size of the displayed fuel bundle field 36. Under the view menu 34, the user has the option to view a single quadrant of the template, or a full core view of the template. Additionally, the user can control whether certain template attributes are displayed. Specifically, the view menu 34 includes the options of displaying the following in the loading template: control blades, bundle coordinates, core coordinates, etc.

Having created the loading template, the user may save the template, or even a partially created template, to the memory 18 by selecting either the "Save" or "Save As" option in the file menu 30.

As discussed above, instead of creating a new template, a previously created template may be viewed and, optionally, edited. Using the file menu 30, the user selects an "open" option. The loading map editor then displays the accessible templates stored in the memory 18 or a directory of memory 18. The user then selects an accessible template, for example, by clicking on one of the accessible templates. The loading map editor will then display the chosen template.

The user may then edit the chosen template. For example, after selecting a fuel bundle position 38 the user may select under the edit menu to "clear" the category assigned to the fuel bundle position 38. Besides the category assigned to this fuel bundle position 38, the loading map editor also clears the category assigned to associated fuel bundle positions 38. Associated fuel bundle positions 38 are those fuel bundle positions 38 that were assigned the fuel bundle category along with the fuel bundle position 38 selected for clearing because of the bundle grouping chosen when the category was assigned to the fuel bundle position 38 chosen for clearing.

When fuel bundle positions 38 assigned the fresh or reinserted category are cleared, the loading map editor adjusts the numbering associated with that category. In the case of the fresh bundle category, this is a conditional action based on whether other bundle positions have been assigned the same fresh bundle type. Specifically, the loading map editor performs a cascade operation such that fuel bundle positions assigned the same category and having higher numbers are renumbered in sequence beginning from the lowest number of a deleted fuel bundle position. For example, if reinsert bundle positions numbered 44, 43 and 42 were cleared, then reinsert bundle position having number 45 would be renumbered 42, reinsert bundle position having number 46 would be renumbered 43, etc. The loading map editor also changes the total count of fuel bundle positions assigned the category being cleared.

When unassigned bundle positions are created through editing, the user may then newly assign categories to the unassigned bundle positions in the same manner and using the same tools to create a template as described above. In so doing, the user may decide to manually assign, for example, an existing priority to a newly assigned reinsert fuel bundle position. In this instance, the reinsert fuel bundle position already having this number and each reinsert fuel bundle position having a higher number are incremented by one.

As a further alternative, the user may want to adapt an existing template for one reactor to another reactor of the same size and physical bundle configuration. To do this, the user may use the "save as" feature in the file menu 30 to create a duplicate of the loading template. Subsequent changes to the bundle field will then apply to the copied template.

In addition to creating a template from 'scratch' or editing an existing template, the user may have the loading map editor derive a template from a previously loaded core. In the loading map editor, using the file menu 30, the user selects an "auto-generate template" option. The loading map editor then displays a list of the accessible fuel cycles stored in the memory 18. Each fuel cycle corresponds to an actual loading map for a fuel cycle of a nuclear reactor. As will be appreciated, the memory 18 may store loading maps for cycles of different nuclear reactors. Accordingly, the list of cycles displayed by the loading map editor identifies both the nuclear reactor and the cycle. From the list the user selects the cycle (hereinafter "the selected cycle") that the template will be derived from. The loading map editor then accesses the loading map for the selected cycle.

The user is then presented with a dialog box for entering input parameters of the derivation process. The input parameters include: a primary attribute (e.g., exposure, K infinity, etc.) for deriving the template, a tolerance level (discussed in detail below), group list members (8, 4, or 2 bundle groupings), bundle symmetry for groups of 4, and a maximum number of assignments to each group list member. For example the user may enter K infinity as the primary attribute, and a tolerance level of 0.2 (which, as described in detail below, is used for forming bundle groups). The user may further enter that groups of 8 and 4 are permitted, the groups of 4 should have mirror symmetry and that a maximum of 14 groups of 4 are permitted. In an exemplary embodiment, the loading map editor provides the user with a drop-down menu. The user selects list members desired for the template from the options given in the drop-down menu. These options include: groups of 8, 4 and 2; groups of 8 and 4; groups of 8 (which forces groups of 4 on the minor axis of the reactor core template); and groups of 4 and 2. In selecting the maximum number of assignments for each group, the user enters this data in the order of the smallest to the largest group size. However, the maximum number of assignments for the largest groups is not entered by the user, as this value is automatically determined based on the maximum number of assignments for the smaller groups.

Once the user enters the input parameters, the loading map editor will begin generating a template.

First the loading map editor asks the user if locked bundle positions are permitted, if so, then the loading map editor requests the user to identify the cycle previous to the selected cycle in the same manner that the selected cycle was identified. The loading map editor then compares the loading map for the selected cycle with the loading map for the previous cycle of the identified nuclear reactor. Specifically, for each bundle position in the reactor, the loading map editor determines if loading maps for the selected and previous cycles have a bundle with the same serial number in the same bundle position. If so, the bundle position is assigned the locked fuel bundle category in the loading template.

After the locked fuel bundle positions are identified, the loading map editor identifies the fresh fuel bundle positions. Specifically, for each bundle position not already identified as a locked bundle position, the loading map editor determines from the characteristics of the selected loading map if the fuel bundle in that bundle position is a fresh fuel bundle. For each identified fresh fuel bundle, the loading map editor also determines the type of fresh fuel bundle from the characteristics of the selected loading map. The loading map editor then assigns the fresh fuel category to the associated fuel bundle position in the template and assigns a type count number N to the fuel bundle position. For each type of fresh fuel bundle located in the selected loading map, the loading map editor assigns a count value to that type. This count value is then assigned to the bundle position along with the fresh fuel bundle category assignment so that fresh fuel bundle positions that should have the same type of fresh fuel bundle are identified by the same value 'N' in the loading template.

Next, the loading map editor determines whether the identified fresh bundle category positions form any bundle groups. As discussed above, the user identifies the bundle group members permitted in the template. The bundle group members form a group members list. For each bundle position assigned the fresh fuel bundle category, the loading map editor first determines if the bundle position (hereinafter the "current bundle position") has already been assigned to a group. If so, then the loading map editor proceeds to the next bundle position. If not, then the loading map editor selects the largest group from the group member list and identifies each of the bundle positions that form such a group with the current bundle position. If each of the bundles positions forming the group has been assigned the fresh bundle category and are of the same type as the current bundle position, then the loading map editor records the group of bundle positions as a group. If each of the bundles positions forming the group has not been assigned the fresh bundle category or one of the bundles is not the same type as the current bundle position, then the loading map editor performs the above-described process for the next largest bundle group in the group member list. This process keeps repeating until a group is formed or there are no more groups in the group member list to test. If the members of the group member list have been tested, and no group has been formed, then the current bundle position is recorded as not belonging to a group.

Next, the loading map editor identifies the reinserted fuel bundle positions. The bundle positions of the template not assigned to the locked or fresh fuel bundle categories are assigned the reinserted fuel bundle category. Then, the loading map editor determines whether the reinserted bundle category positions form any bundle groups. For each bundle position assigned the reinserted fuel bundle category, the loading map editor first determines if the bundle position (hereinafter the "current bundle position") has already been assigned to a group. If so, then the loading map editor proceeds to the next bundle position. If not, then the loading map editor selects the largest group from the group member list and identifies each of the bundle positions that form the group with the current bundle position. If each of the bundles positions forming the group has not been assigned the reinserted bundle category, then the loading map editor determines if the next largest group in the group member list includes all reinserted fuel bundle positions. If no group from the group member list results in a group of reinserted fuel bundles, then the loading map editor records the current fuel bundle position as not belonging to a group.

Once a group has been formed, the loading map editor calculates the average attribute value for the group. As discussed above, the user identified a primary attribute to use in deriving the template. Here, the loading map editor uses that attribute value for each fuel bundle in the selected loading map forming the associated group in the template to calculate the average attribute value. The loading map editor then determines if the attribute value for each fuel bundle in the group is with the tolerance level from the average attribute. Again, here, the tolerance level was a user input design parameter as discussed above.

If the attribute value for each fuel bundle in the group is within the tolerance level of the average attribute value, then the loading map editor records the associated fuel bundle positions in the template as belonging to a group. Otherwise, the loading map editor performs the above-described process for the next largest bundle group in the group member list. This process keeps repeating until a group is formed or there are no more groups in the group member list to test. If the members of the group member list have been tested, and no group has been formed, then the current bundle position is recorded as not belonging to a group.

The loading map editor then determines if the user specified maximum for a group in the group member list has been violated. If so the editor performs a group recombination and ranking process. For example, if the number of groups of 2 exceeds the user specified maximum the editor does the following: For each group of 2, the loading map editor determines if another group of 2 forms a group of 4 meeting the symmetry requirements entered by the user. The loading map editor then determines the average attribute value and standard deviation for each newly formed potential group of 4 and ranks the potential groups of 4 based on minimum standard deviation. Next, the highest ranked groups (i.e., those with the lowest standard deviation) are assigned to the groups of 4 until the groups of 2 list does not exceed the maximum number allowed based on the user input. Those potential groups of 4 not assigned remain as groups of two. Next, the same process is performed to combine groups of 4 into groups of 8 assuming the user input parameters permit groups of 8 and the user specified maximum for groups of 4 has been violated.

As a final step, the reinserted fuel bundles are assigned a priority number that, as described above, appears in the template. The fuel bundles positions are ranked based on (1) the attribute value for the fuel bundle in the associated position in the loading map if the fuel bundle position does not form part of a group; or (2) by the average attribute value of the group if fuel bundle position does form part of a group. A priority number is then assigned by this ranking with the fuel bundles having the same average attribute assigned the same priority number.

This completes the template derivation process, the resulting template is then displayed in the loading map editor allowing the user to save the resulting template for future use.

Using the present invention as described above, a core designer may capture his experience and rules of thumb associated with the initial design of a loading map. Furthermore, this knowledge may then be used by others to improve or adapt templates to existing core designs.

Creating Loading Map

The loading map editor according to the present invention includes additional functionality that allows the user to generate a loading map from the loading template. In addition, the loading map editor provides increased flexibility in creating the loading map by allowing the user the option of reloading fuel bundles currently residing in one or more fuel pools.

After accessing, creating and/or editing a reactor core template using the loading map editor as discussed above, the user may then create a loading map using the template. From the file menu 30, the user chooses a "load" option. The loading map editor then displays a loading screen that includes a template access window, template information window, reload window and a load fresh window. The template access window provides a user with a drop down menu for selecting a loading template stored in the memory 18. The template information window displays summary information for the selected loading template. The summary information includes, but is not limited to, the number of fresh bundle types, the number of reinserted fuel bundle positions and the number of locked bundle positions in the loading template. The summary information may also indicate the number of fresh bundle types and number of reinserted bundles currently added in creating the loading map.

Figure 3:
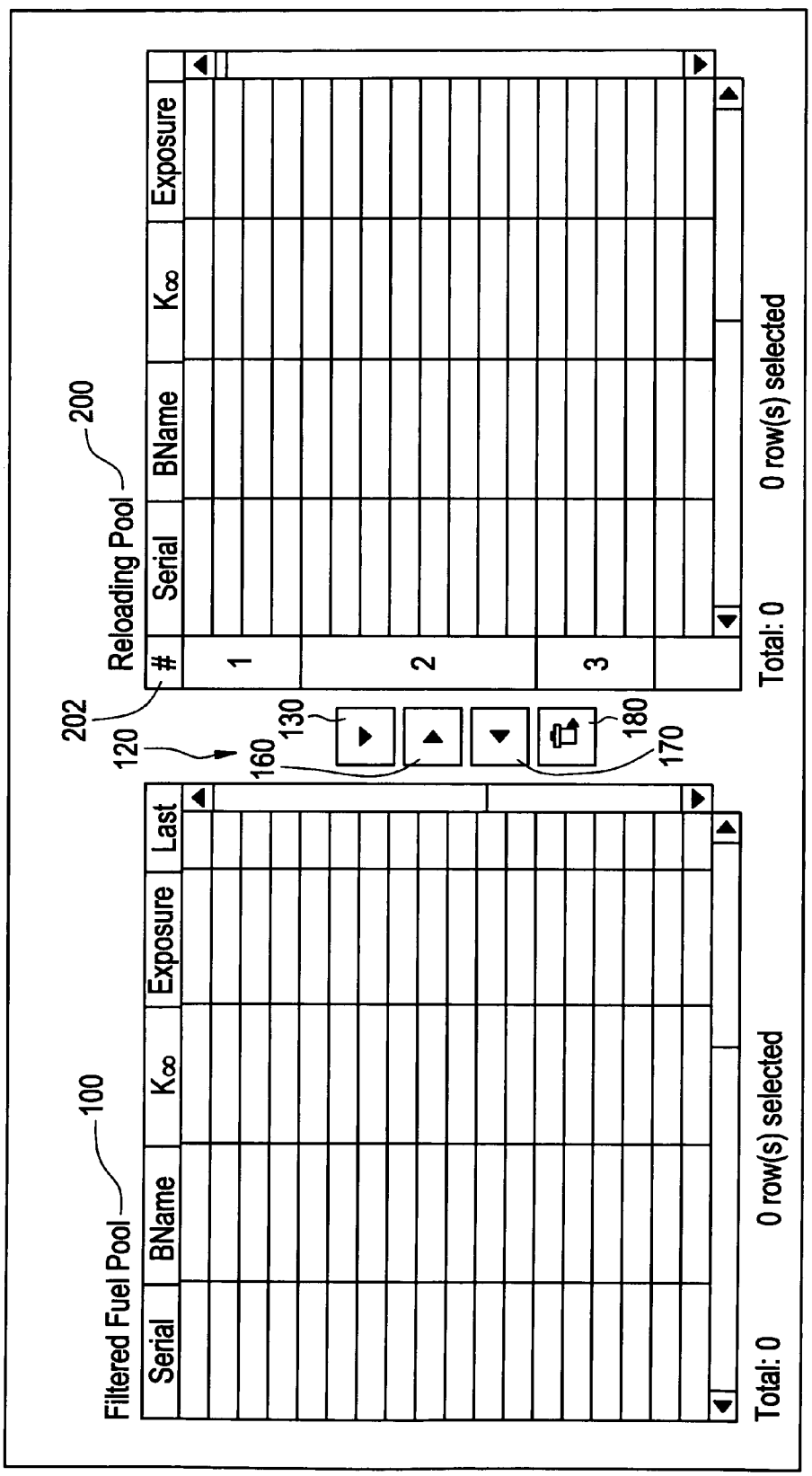
FIG. 3 illustrates a reload window displayed by a loading map editor of the present invention.

FIG. 3 illustrates an exemplary embodiment of a reload window displayed by the loading map editor. The window is divided into two parts: a filtered fuel pool table 100 and a reloading pool 200. The filtered fuel pool table 100 lists (1) the exposed fuel bundles currently in the nuclear reactor under consideration, except for those fuel bundles in locked fuel bundle positions 38, and (2) the fuel bundles in one or more fuel pools for this and other nuclear reactors. As is well-known, exposed fuel bundles removed from a nuclear reactor are stored in what is known as a fuel pool. Fuel bundles from two or more nuclear reactor cores located at a same site may be stored in the same fuel pool.

As shown in FIG. 3, the filtered fuel pool table 100 lists each exposed fuel bundle by its serial number and bundle name. Each fuel bundle is assigned a unique serial number, used to assure traceability of the bundle from a quality assurance perspective. The bundle name is a character string identifier used to identify the fuel bundle product line as well as nuclear characteristics, such as uranium and gadolinia loading. The filtered fuel pool table 100 also lists one or more attributes of each exposed fuel bundle listed. These attributes may include K infinity, exposure, and the last fuel cycle number for which the bundle was resident in the core. Additional attributes for an exposed fuel bundle may include: 1) bundle product line, 2) initial uranium loading, 3) initial gadolinium loading, 4) number of axial zones, 5) historical fuel cycle numbers previous to the most recent for which the bundle was resident in the core, 6) the corresponding reactor in which the fuel bundle was resident for each of the historical fuel cycles, 7) accumulated residence time, and 8) fuel bundle pedigree, a parameter that reflects the usability of the bundle for continued reactor operation.

The fuel bundle pedigree is determined from a number of factors the foremost being an inspection of the fuel, either visually or by some other non-destructive test procedure, which is designed to detect a current failed fuel bundle or the vulnerability of the bundle to future failure. Failure mechanisms include such items as corrosion, debris impact, and mechanical bowing of the fuel bundle. Another factor affecting pedigree is possible reconstitution of a fuel bundle, which is a repair process involving the replacement of damaged fuel rods with replacement rods that may be a uranium containing fuel rod or alternatively, a non-uranium containing rod (e.g. stainless steel), henceforth referred to as a 'phantom' rod. A pedigree attribute might be 'RU' and 'RP' for reconstituted with uranium and phantom rods, respectively, and 'DC', 'DD' and 'DB' for damaged by corrosion, debris, and bow, respectively. A 'blank' pedigree attribute would designate a bundle that was undamaged and useable.

All attributes with the exception of bundle pedigree are populated within the database via a direct relationship with the historical fuel cycles. The fuel pedigree attribute for non 'blank' designations are entered into the database via a separate process that is tied to fuel inspection and reconstitution services. In this process, the fuel bundles in a fuel pool are inspected and the pedigrees of the fuel bundles ascertained from the inspection. Then, a bundle status program is accessed. The bundle status program provides a GUI menu for 'Fuel Inspection', which is accessed by the user. The user clicks on the pulldown menu 'Add' from the 'Fuel Inspection' menu, and is presented with a pop-up for typing in the bundle serial number and the pedigree designation, such as 'DD' corresponding to a debris damaged bundle. The pedigree data entered in this manner is associated with the fuel pool database. The user may also click a 'Census' option from the 'Fuel Inspection' menu. Selecting this option will perform a query of the fuel pool database and present the user with a list of bundle serial numbers and corresponding attribute data, as described previously, for those bundles containing a non-null pedigree designation. The user may elect to change existing pedigree information by selecting the bundle entry, right-clicking a 'Modify' option, which activates the pedigree attribute field, and entering the modified pedigree information. For example, a bundle that was previously damaged may have been reconstituted. Alternatively, the user may right-click a 'Delete' option, which has the effect of reverting the bundle pedigree status back to null.

The reloading fuel pool table 200 provides the same information for each fuel bundle as provided by the filtered fuel pool table 100. Additionally, the reloading fuel pool table 200 indicates the priority number 202 for each fuel bundle group as set forth in the loading template. As discussed above with respect to the loading template, reinserted fuel bundles may be assigned as a group of 1, 2, 4 or 8 bundles. Accordingly, FIG. 3 shows that the highest priority reinserted fuel bundle position(s) are a group of four fuel bundles, and the next highest priority reinserted fuel bundle(s) are a group of eight fuel bundles.

The reloading fuel pool table 200 is populated by moving fuel bundles from the filtered fuel pool table 100 into the reloading fuel pool table 200. As further shown in FIG. 3, the reload window further includes a set of tools 120 for aiding the user in selecting and moving fuel bundles from the filtered fuel pool table 100 to the reload fuel pool table 200. The set of tools 120 include, but are not limited to, a filter tool 130, a move right tool 160, a move left tool 170 and a delete tool 180.

A user selects the filter tool 130 by, for example, clicking on the filter tool 130. This opens a filter window as shown in FIG. 4. As shown, the filter window lists the same attributes listed in the filtered fuel pool table 100, and allows the user to indicate to filter based on the attribute by clicking in the selection box 132 associated with the attribute. When an attribute has been selected, a check is displayed in the associated selection box 132. The user may also unselect an attribute by again clicking in the associated selection box. In this case, the check mark will be removed.

For each attribute, the filter window may display one or more filter characteristics associated with the attribute. For example, for the filter characteristics of the K infinity attribute, the user may select a filter operator 134 of greater than, less than, or equal to and enter in a filter amount 136 associated with the filter operator 134. As shown in FIG. 4, a user has selected to filter based on K infinity, chosen the greater than filter operator, and entered the filter amount of 1.2. As a result, the loading map editor will filter the fuel bundles in the filtered fuel pool table 100 to display only those fuel bundles having a K infinity greater than 1.2. As another example, the exposure attribute also has an associated filter operator and filter amount.

As will be appreciated, the filter characteristics of an attribute will depend on the attribute. Also, as will be appreciated, other methodologies for indicating the filter characteristics may be possible. For example, for the cycle attribute, the filter window provides a drop down menu for selecting the cycle number. FIG. 4 shows cycles 2 and 4 selected from the drop down menu for the cycle attribute. As a result, the loading map editor filters the filtered fuel pool table 100 to display only those fuel bundles whose most recent residence was in cycle 2 or cycle 4. Similarly, the user may elect to filter bundles based on their pedigree, product line, etc. Once the attributes for filtering on have been selected and the filter characteristics have been entered, the user causes the loading map editor to filter the filtered fuel pool table based on this information by clicking on the OK selection box. Alternatively, the user may cancel the filter operation by clicking on the CANCEL selection box.

The filtered fuel pool table 100 also provides a filtering mechanism for filtering the fuel bundles listed therein. A user may sort the filtered fuel pool table 100 in ascending or descending order of an attribute by clicking on the attribute heading in the filtered fuel pool table 100. Once the user clicks on the attribute, the loading map editor displays a popup menu with the options "Sort Ascending" and "Sort Descending". The filtered fuel pool table 100 is then filtered in ascending or descending order of the attribute based on the option clicked on by the user.

To move fuel bundles from the filtered fuel pool table 100 to the reload fuel pool table 200, the user selects the fuel bundles for transfer by clicking and dragging to highlight one or more of the fuel bundles in the filtered fuel pool table 100. Then the user clicks on the move right tool 160. This causes the selected fuel bundles to populate the highest priority unpopulated fuel bundle positions in the reload fuel pool table 200. Alternatively, a user clicks and drags the highlighted fuel bundles into one of the priority sections of the reloading fuel pool table 200.

Fuel bundles may also be moved from the reload fuel pool table 200 back into the filtered fuel pool table 100 by selecting fuel bundles in the reload fuel pool table 200 and clicking on the move left tool 170. Alternatively, the selected fuel bundles may be clicked and dragged back to the filtered fuel pool table 100.

The delete tool 180 provides the user with the function of deleting fuel bundles from either the filtered or reload fuel pool tables 100 and 200. The user may select one or more fuel bundles in one of the tables, and click the delete tool to delete the selected fuel bundles from the table.

Figure 5:
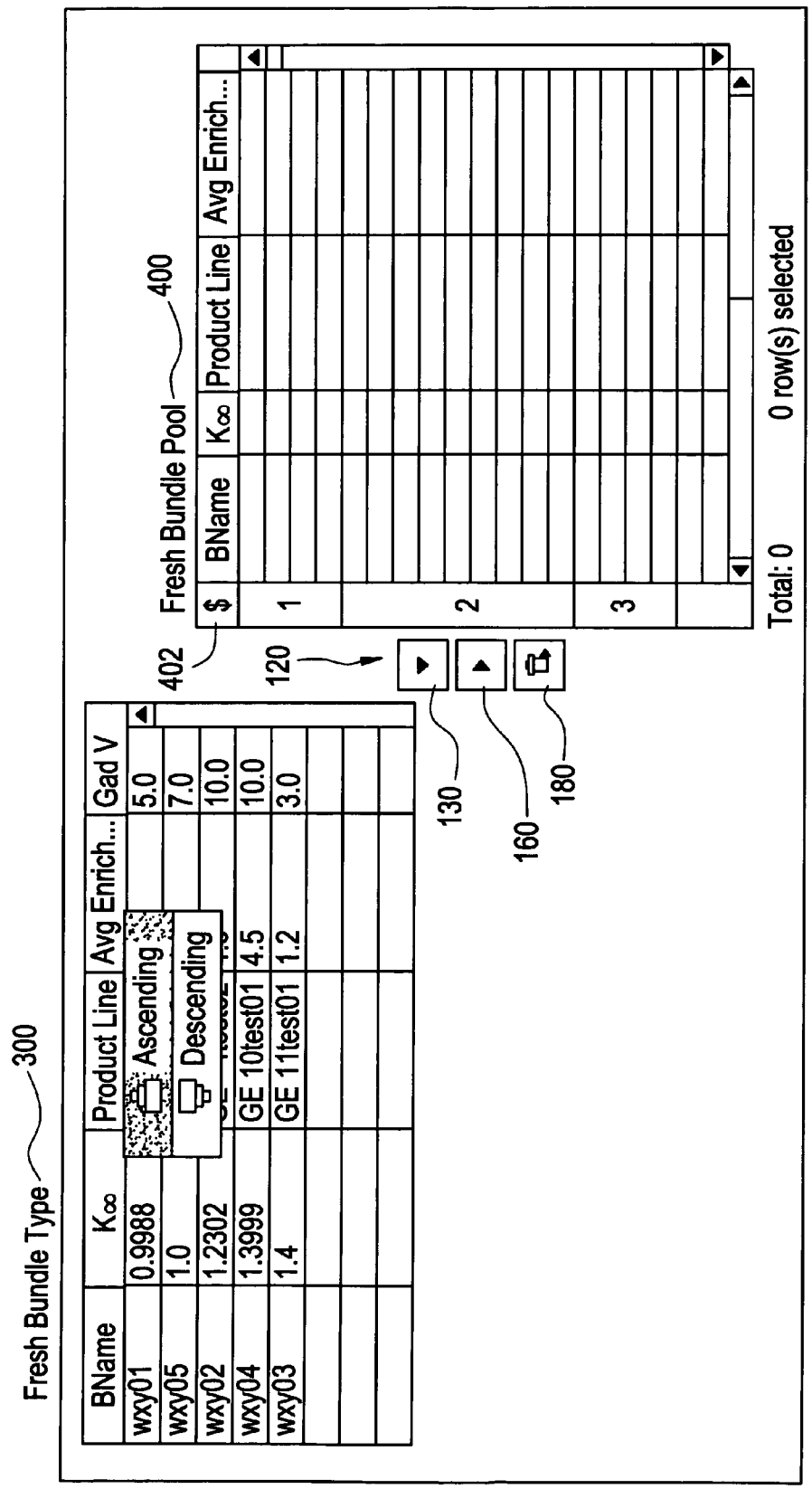
FIG. 5 illustrates a load fresh window displayed by a loading map editor of the present invention.

Next, the loading of fresh bundles into the template will be described. FIG. 5 illustrates an exemplary embodiment of a load fresh window displayed by the loading map editor. The window is divided into two parts: a fresh bundle types table 300 and a fresh bundle pool table 400. The fresh bundle types table 300 lists the available fresh fuel bundle types.

As shown in FIG. 5, the fresh bundle types table 300 lists each fresh fuel bundle type by its bundle name. The bundle name is a character string identifier used to identify the fuel bundle product line as well as nuclear characteristics, such as uranium and gadolinia loading. The fresh fuel bundle types table 300 also lists one or more attributes of each fresh fuel bundle type listed. These attributes may include K infinity, fuel bundle product line, average uranium-235 enrichment, percent (as a function of total fuel weight) of gadolinia burnable poison contained in the fuel bundle, number of gadolinia-containing fuel rods, and number of axial zones, where an axial zone is defined by a cross-sectional slice of the bundle that is homogeneous along the axial direction. Other attributes of the fresh bundle may include parameters for predicted thermal behavior, such as R-factors and local peaking, calculated for various bundle exposure values. R-factors are used as inputs to the critical power ratio (CPR) and are determined from a weighted axial integration of fuel rod powers. Local peaking is a measure of the fuel rod peak pellet and clad temperature.

The fresh bundle pool table 400 provides the same information for each fuel bundle as provided by the fresh bundle types table 300. Additionally, the fresh bundle pool table 400 indicates the type number 402 for each type of fresh bundle in the loading template and then number of fresh fuel bundles of that type in the loading template. FIG. 5 shows that the first type of fresh fuel bundle position(s) are a group of four fuel bundles, and the next type of fresh fuel bundle(s) are a group of eight fuel bundles.

The fresh bundle pool table 400 is populated by moving fuel bundles from the fresh bundle types table 300 into the fresh bundle pool table 400. As further shown in FIG. 5, the load fresh window includes the same filter tool 130, move right tool 160 and delete tool 180 for aiding the user in selecting and moving fuel bundles from the fresh bundle types table 300 to the fresh bundle pool table 400 as already described above. As will be appreciated, because the attributes for the fresh fuel bundles are different than the reinserted fuel bundles the filtering characteristics may also differ accordingly. The loading map editor also provides, as shown in FIG. 5, for filtering the fresh bundle types table 300 in ascending or descending order of an attribute in the same manner that the filtered fuel pool table 100 may be sorted.

The selection and moving process for fresh fuel bundles does differ from the process for moving burnt fuel because the destination of the fuel must be chosen in the grouped fresh fuel bundle pool table 400 located on the right side of the fresh bundle types table 300. Namely, after a user selects the fresh bundle type from the fresh bundle types table 300, the user then selects one or more fuel bundle positions in the fresh fuel bundle pool table 400. By selecting the move right tool 160, the selected fuel bundle positions in the fresh fuel bundle pool table 400 are populated with the selected fresh bundle type. Alternatively, the user may click and drag the bundle type into the fresh fuel bundle pool table 400. Unlike with the filtered fuel pool table 100, the fresh fuel types are not removed from the fresh bundle types table 300 but are, instead, copied as fuel bundles into the fresh bundle pool table 400.

Once the reinserted and fresh fuel bundle positions 38 are filled using the tools described in detail above, the user may click on a "populate" button displayed in the loading screen to have the loading map displayed. The user may then save the created loading map by using the "Save" or "Save As" options in the file menu 30.

Having created the loading map, the user may then perform simulations on reactor core performance, etc. using the loading map created according to the methodologies of the present invention.

By allowing the user to draw on the resources of the fuel pool(s), the present invention provides for greater flexibility in the creation of the loading map and may also reduce the overall cost in loading a nuclear reactor core.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of moving nuclear fuel from a fuel pool with a graphical user interface, the method comprising:
inputting at least one fuel attribute into the graphical user interface;
graphically populating, by the graphical user interface, a graphical loading map with graphical fuel bundles,
the graphical fuel bundles representing fuel bundles in at least one fuel pool,
the graphical user interface populating the graphical loading map according to the input at least one fuel attribute and at least one corresponding attribute of the nuclear fuel bundles represented by the graphical fuel bundles, the graphical user interface including one or more loading tools configured to graphically select, sort, filter, or move the graphical fuel bundles into the graphical loading map based on the at least one corresponding attribute of the fuel bundles represented by the graphical fuel bundles;

graphically filtering, by the graphical user interface, the graphical fuel bundles in the graphical loading map, the graphical filtering based on the input of at least one fuel attribute; and physically placing the fuel bundles into a reactor core according to the populated graphical loading map.

2. The method of claim 1, wherein the graphical user interface further includes at least one fuel pool table and a reload table, and wherein the graphically populating includes graphically selecting, sorting, filtering, or moving the graphical fuel bundles within or among the graphical loading map, the at least one fuel pool table, and the reload table via the one or more loading tools, the selecting, sorting, filtering, and moving being based on the one or more fuel attributes of the fuel bundles represented by the graphical fuel bundles.

3. The method of claim 2, further comprising:
storing at least one fuel pool database, the fuel pool database including a fuel pool list of at least one of the fuel bundles residing in the fuel pool; and
graphically populating the at least one fuel pool table with a graphical representation of at least one of the fuel bundles on the fuel pool list.

4. The method of claim 2, wherein the graphical user interface further includes a fresh fuel table, and wherein the graphically populating includes graphically selecting, sorting, filtering, or moving the graphical fuel bundles within or among the loading map, the at least one fuel pool table, the reload table, and the fresh fuel table via the one or more loading tools, the selecting, sorting, filtering, and moving being based on the one or more fuel attributes of the fuel bundles represented by the graphical fuel bundles.

5. The method of claim 4, further comprising:
storing at least one fresh fuel database, the fresh fuel database including a fresh fuel list of at least one of the fresh fuel bundles; and
graphically populating the at least one fresh fuel table with a graphical representation of at least one of the fuel bundles on the fresh fuel list.

6. The method of claim 1, further comprising:
analyzing the populated graphical loading map by simulating reactor performance with the populated graphical loading map, the analyzing performed before the physically placing the fuel bundles into the reactor core according to the populated graphical loading map.

7. The method of claim 1, wherein the one or more fuel attributes include at least one of exposure, a previous cycle in which the fuel bundle was used, k infinity, bundle product line, initial uranium loading, initial gadolinium loading, number of axial zones, historical fuel cycle numbers previous to a most recent for which the fuel bundle was used, a corresponding reactor core in which the fuel bundle was resident for each of the historical fuel cycles, accumulated residence time, and fuel bundle pedigree, which is a parameter that reflects usability of the fuel bundle for continued reactor operation.

8. A method of moving nuclear fuel from a fuel pool, the method comprising:
inputting at least one fuel attribute into the graphical user interface;

providing the graphical user interface including a graphical loading map graphically representing fuel bundles in a reactor core;

graphically sorting, filtering and moving, with one or more loading tools within the graphical user interface, graphical bundles into the graphical loading map, the sorting, filtering, and moving based on at least one fuel attribute of the fuel bundles represented by the graphical fuel bundles, at least one of the graphical fuel bundles representing a fuel bundle in a fuel pool; and physically placing the fuel bundles into the reactor core according to the populated loading map.

9. The method of claim 8, wherein the graphical user interface further includes at least one fuel pool table graphically representing bundles in a fuel pool and a reload table, and wherein the method further comprises:
graphically selecting, sorting, filtering, or moving the graphical fuel bundles based on the one or more fuel attributes of the fuel bundles represented by the graphical fuel bundles within or among the fuel pool table and the reload table, wherein the graphically populating the loading map includes graphically populating the loading map with graphical fuel bundles moved into the reload table.

10. The method of claim 9, further comprising:
storing at least one fuel pool database, the fuel pool database including a fuel pool list of at least one of the fuel bundles residing in the fuel pool; and
graphically populating the at least one fuel pool table with a graphical representation of at least one of the fuel bundles on the fuel pool list.

11. The method of claim 9, wherein the graphical user interface further includes a fresh fuel table, and wherein the graphically populating includes graphically selecting, sorting, filtering, or moving the graphical fuel bundles within or among the graphical loading map, the at least one fuel pool table, the reload table, and the fresh fuel table via the one or more loading tools, the selecting, sorting, filtering, and moving being based on the one or more fuel attributes of the fuel bundles represented by the graphical fuel bundles.

12. The method of claim 10, further comprising:
storing at least one fresh fuel database, the fresh fuel database including a fresh fuel list of at least a portion of available fresh fuel bundles; and
graphically populating the at least one fresh fuel table with a graphical representation of at least one of the fresh fuel bundles on the fresh fuel list.

13. The method of claim 8, further comprising:
analyzing the populated graphical loading map by simulating reactor performance with the populated graphical loading map, the analyzing performed before the physically placing the fuel bundles into the reactor core according to the populated graphical loading map.

14. The method of claim 8, wherein the one or more fuel attributes include at least one of exposure, a previous cycle in which the fuel bundle was used, k infinity, bundle product line, initial uranium loading, initial gadolinium loading, number of axial zones, historical fuel cycle numbers previous to a most recent for which the fuel bundle was used, a corresponding reactor core in which the fuel bundle was resident for each of the historical fuel cycles, accumulated residence time, and fuel bundle pedigree, which is a parameter that reflects usability of the fuel bundle for continued reactor operation.

* * * * *